United States Patent [19]

Schucker

[11] Patent Number: 5,030,355

[45] Date of Patent: Jul. 9, 1991

[54] THIN FILM COMPOSITE MEMBRANE PREPARED BY SUSPENSION DEPOSITION

[75] Inventor: Robert C. Schucker, Baton Rouge, La.

[73] Assignee: Exxon Research & Engineering Company, Florham Park, N.J.

[21] Appl. No.: 371,886

[22] Filed: Jun. 27, 1989

Related U.S. Application Data

[62] Division of Ser. No. 108,819, Oct. 14, 1987, Pat. No. 4,861,628.

[51] Int. Cl.$^5$ ............................................. B01D 61/36
[52] U.S. Cl. ................................ 210/640; 210/500.37
[58] Field of Search ................... 210/640, 654, 500.37, 210/651, 490; 427/244, 385.5, 245; 264/41

[56] References Cited

U.S. PATENT DOCUMENTS 4,879,044  11/1989  Feimer et al. ............... 210/500.37 X

*Primary Examiner*—Frank Spear
*Attorney, Agent, or Firm*—Joseph J. Allocca

[57] ABSTRACT

Thin film membranes of polyurea, polyureapolyurethane alloy, polyurea-polyurea/urethane alloy or polyurea/urethane are prepared by deposition of a thin film of suspension of the selected polymer on a thick permeable support layer by the technique of preparing a suspension of the selected polymer in a solvent which does not dissolve the thick permeable support layer and permitting the solvent to evaporate and/or permeate through the thick-permeable layer.

7 Claims, No Drawings

THIN FILM COMPOSITE MEMBRANE PREPARED BY SUSPENSION DEPOSITION

CROSS REFERENCE TO RELATED APPLICATIONS

This application is a Rule 60 Divisional of U.S. Ser. No. 108,819 filed Oct. 14, 1987, now U.S. Pat. No. 4,861,628.

BRIEF DESCRIPTION OF THE INVENTION

Thin film composite membranes comprising a thin active layer of polyurea/urethane copolymer, polyurea, polyurea-polyurethane alloy or polyurea-polyurea/urethane deposited from a dispersion-suspension onto a thick porous support layer are disclosed. These membranes are useful for separating aromatics from non-aromatics, especially under pervaporative or perstractive conditions.

BACKGROUND OF THE INVENTION

The use of membranes to separate aromatics from saturates has long pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby minimize the concentration gradient driving force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e. aromatic, unsaturated, saturated, by permeating a portion of the mixture through a non-porous cellulose ether membrane and removing permeate from the permeate side of the membrane using a sweep gas or liquid. Feeds include hydrocarbon mixtures, naphtha (including virgin naphtha, naphtha from thermal or catalytic cracking, etc.)

U.S. Pat. No. 2,930,754 teaches a method for separating hydrocarbons e.g. aromatic and/or olefins from gasoline boiling range mixtures, by the selective permeation o the aromatic through certain cellulose ester non-porous membranes. The permeated hydrocarbons are continuously removed from the permeate zone using a sweep gas or liquid.

U.S. Pat. No. 4,115,465 teaches the use of polyurethane membranes to selectively separate aromatics from saturates via prevaporation.

DESCRIPTION OF THE INVENTION

A technique for producing thin film composite membranes (TFC's) is disclosed. The technique comprises producing a suspension of a polymer which is described as the thin, dense, active separation layer and using this suspension of polymer to deposit a layer of said polymer on a thick, permeable support layer.

In particular, a suspension of a fine dispersion of discrete polyurea/urethane polymer particles or polyurea polymer particles or discrete particles of polyurea polymer and polyurea/urethane copolymer or discrete particles of polyurea and polyurethane is produced in a solvent which does not react with or dissolve the selected thick permeable support layer (a non-dissolving solvent).

The selected thick-permeable support layer is contacted with the polymer dispersion in the dispersing solvent. This contacting is effected in such a way that only one face of the support layer is exposed to the polymer dispersion suspension. Thus, a flat sheet of support layer can have a quantity of polymer dispersion poured onto it. The non-dissolving solvent is then permitted to evaporate from the poured layer or permeate through the thick permeable support layer; in either case depositing a thin film of dense selective polymer onto the support layer.

In this way a thin film composite membrane is produced.

The support layer can be any porous material which is insoluble in the materials to which the finished membrane will be exposed. Porous polymeric material having pores ranging from about 0.005 to about 0.5 microns can be utilized as the support is present solely as the underlying substrate upon which the active layer is deposited. The support exhibits no separation/selectivity influence in the membrane system. The upper limit of pore size is set solely by the requirement that the polymeric material to be deposited thereon from the suspension at the concentration used not pass through the pores, i.e. that the pores by smaller than the polymer particles in the dispersion. In this way a film of the polymer in the suspension dispersion will be deposited on the support.

Typical supports can include polyamide, polyimide, polyacrylonitrile, polybenzimidazole, teflon, cellulose acetate and polyolefins such as polyethylene and polypropylene.

Any polymer which can be suspended as a fine dispersion in a solvent can be deposited by this technique as a thin (2 or less) layer of selective film in the support layer. The polymer concentration in the suspension-dispersion can range from about 0.5 to about 10%, preferably about 1 to about 5%, most preferably about 2 wt % polymer in the suspension. Particularly preferred polymers for deposition by the present technique for production of a thin film composite membrane is a polyurea/urethane copolymer polyurea polymer, polyurea-polyurethane polymer mechanical mixtures and mechanical mixtures of polyurea polymer with polyurea/urethane copolymer. The polymer suspension is produced by preparing the polymer itself in the chosen non-dissolving dispersing non-solvent.

Examples of non-dissolving dispersing non-solvents are 1,4-dioxane, cellosolve acetate, tetrahydrofuran, ketones (e.g. acetone) and aromatic solvents such as toluene or xylenes.

Thus, the various components going into the production of the desired polymer are dissolved in an appropriate solvent and the individual solutions are mixed and permitted to react. The polymer product is insoluble in the solvent(s) in which the starting materials are dissolved thereby resulting in the production of a fine dispersion of polymer in suspension. With polymer concentrations of only 0.5 to 10%, preferably 1–5% in the solution, the polymer forms as a fine dispersion or suspension and not a solid mass of precipitate.

Thin film composite membranes made by depositing a thin active layer of polyurea/urethane copolymer or polyurea polymer or polyurea-polyurethane polymer mechanical mixture or mechanical mixtures of polyurea with polyurea-urethane copolymer from a dispersion-suspension onto a thick porous support layer are useful for separating aromatic hydrocarbons from saturated hydrocarbons and are of particular utility in the chemicals industry for recovering aromatics such as benzene, toluene, xylenes etc. from chemical streams and in the petroleum industry for recovering aromatics from non-aromatics in heavy feed streams such as naphtha, heavy cat naphtha, light cat gas oil, light aromatics containing streams boiling in the $C_5$-300° F. range etc.

The polyurea/urethane copolymer or polyurea polymer or polyurea-polyurethane mechanical alloy mixture used to produce the thin active layers of polyurea/urethane or polyurea or polyurea-polyurethane alloy which are effective when used in the form of membranes in performing the above described aromatic/-non-aromatic separations are described in copending applications U.S. Ser. No. 08,822, now U.S. Pat. No. 4,914,064, U.S. Ser. No. 08,818, now abandoned, and U.S. Ser. No. 08,823, now abandoned, respectively, all filed even date herewith in the name of Robert C. Schucker.

The polyurea/urethane layer which is effective in separating aromatics from non-aromatics is distinguished by possessing certain specific characteristics.

The polyurea/urethane polymer used to produce the thin active layer is characterized by possessing a urea index, defined as the percentage of the total of urea and urethane groups which are urea of at least about 20% but less than 100%, an aromatic carbon content of at least about 15 mole percent, a functional group density of at least about 10 per 1000 grams of polymer and a $C=O/NH$ ratio of less than about 8.

The aromatic polyurea/urethane layer is produced using an aromatic polyurea/urethane copolymer which is itself prepared by reacting dihydroxy or polyhydroxy compounds (e.g., polyethers or polyesters of about 250 to 5000 molecular weight mixtures of different molecular weight polymers of the same type, i.e. about 30:70/70:30 mixtures of an about 500 molecular wt. polyester and an about 2000 molecular wt. polyester may also be employed) with aliphatic, alkylaromatic or aromatic diisocyanates or polyisocyanates and low molecular weight chain extenders, such as diamines, polyamines or amino alcohols. The choice of the molecular weight of the polyether or polyester component is a matter of comprise. Polyethers or polyesters components of 500 molecular weight give membranes of height selectivity but lower flux. Polyester or polyether of higher molecular weight (e.g. 2000 and higher) give membranes of lower selectivity but with increased flux. Thus, the choice of the single molecular weight or blend is a matter of choice and compromise between selectivity and flux. The ratio and molecular weight of these components used in producing the polyurea-urethane copolymer are governed by the aforementioned characteristics possessed by the membrane useful for aromatic from saturate separation. The copolymer produced possesses a urea index of at least 20% but less than 100%, preferably at least about 30% but less than 100%, most preferably at least about 40% but less than 100%. By urea index is meant the percentage of urea groups relative to the total urea plus urethane groups in the polymer. The copolymer also contains at least about 15 mole percent, and preferably at least about 20 mole percent aromatic carbon, expressed as a percent of the total carbon in the polymer. The copolymer also possesses a particular density of functional groups (DF ratio) defined as the total of $C=O+NH$ per 1000 grams of polymer, the density of functional group being greater than about 10, preferably greater than about 12.

Finally, to insure that the functional groups are not mostly carbonyl, the $C=O/NH$ ratio is less than about 8 and preferably less than about 5.0. This insures that there is sufficient hydrogen bonding within the polymer, resulting in strong polymer chain interactions and high selectivity.

Membranes made from urethane and polyurethane polymers which do not possess the characteristics recited above are inferior for the separation of aromatics from saturates when compared to the membranes of the present invention. Polyurea/urethane membranes which are not aromatic (i.e. contain less than at least 15 mole percent aromatic carbon expressed as a percent of the total carbon in the polymer) are inferior to the aromatic polyurea/urethane membranes which are the subject of the present invention.

The membranes of the present invention are especially well suited for separating aromatics from saturates in heavy feeds, such as heavy cat naphtha, wherein the constituents making up the feed include, in some cases, highly complex, multi-ring, heavily substituted aromatic species.

As previously stated, the thin film composite membranes are produced from a polyurea/urethane copolymer made from dihydroxy or polyhydroxy compounds, such as polyethers or polyesters of 250 to 5000 molecular weight, reacted with aliphatic alkylaromatic or aromatic diisocyanates or polyisocyanates and low molecular weight chain extenders, such as diamines, polyamines or amino alcohols.

The polyester components are prepared from aliphatic or aromatic dicarboxylic acids and aliphatic or aromatic dialcohols. Aliphatic dicarboxylic acids refer to those materials having the general formula HOOCRCOOH wherein R contains 2 to 10 carbons (and may be either a straight or branched chain configuration). Aromatic dicarboxylic acids refer to those materials having the general structure HOOCRCOOH where R is:

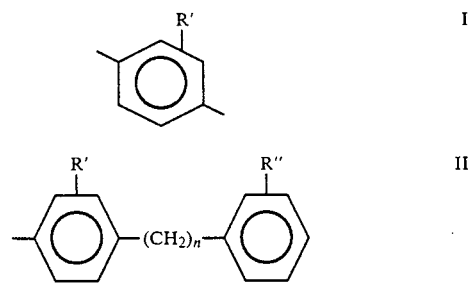

wherein R' and R" may be the same or different and are selected from the group consisting of H and $C_1$-$C_5$ carbons or $C_6H_5$ and combinations thereof, and n is 0 to 4. It is to be understood that in the above formula each R' or R" may itself represent a mixture of H, $C_1$-$C_5$ or $C_6H_5$.

Dialcohols have the general structure HOROH where R may be

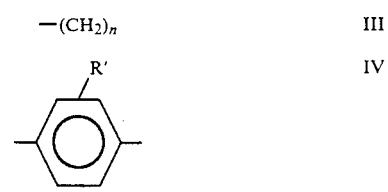

where n is 1 to 10, preferably 4 to 6, and R' is H, $C_1$ to $C_5$ or $C_6H_5$ or

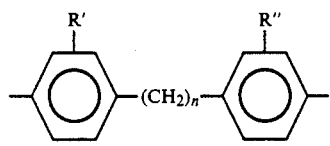

V where R', R" and n are defined in the same manner as for the aromatic dicarboxylic acids.

The diisocyanates are preferably aromatic diisocyanates having the general structure:

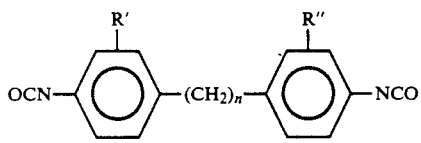

VI wherein R' and R" are the same or different and are selected from the group consisting of H, $C_1$-$C_5$ and $C_6H_5$ and n ranges from 0 to 4.

Diamine chain extenders have the general formula $H_2NRNH_2$ where R includes aliphatic and aromatic moieties such as

VII where n is 1 to 10.

Also included are diamine chain extenders of the formula:

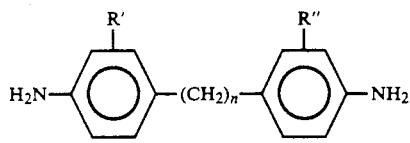

VIII where R' and R" are the same or different and are selected from the group consisting of H or Cl or a $C_1$ to $C_5$ or $C_6H_5$ and n ranges from 0 to 4.

Examples of the polyether polyols useful in the present invention as polymer precursors are polyethylene glycols, (PEG), polypropylene glycol (PPG), polytetramethylene glycol, PEG/PPG random copolymers, etc. having molecular weights ranging from about 250 to 4000. Aliphatic diisocyanates which may be utilized are exemplified by hexamethylene diisocyanate (HDI), 1,6-diisocyanato-2,2,4,4-tetramethylhexane (TMDI), 1,4-cyclohexanyl diisocyanate (CHDI), isophorone diisocyanate (IPDI), while useful alkylaromatic diisocyanates are exemplified by toluene diisocyanate (TDI) and bitolylene diisocyanate (TODI). Aromatic diisocyanates are exemplified by 4,4' diisocyanato diphenyl methane (MDI). Polyisocyanates are exemplified by polymeric MDI (PMDI) and carbodiimide modified MDI. Useful polyamines are exemplified by polyethyleneimines and 2,2',2" triaminotriethylamine. Useful amino alcohols are exemplified by 6-aminohexanol, 4-aminophenol, 4-amino-4'-hydroxydiphenylmethane.

Similarly the highly aromatic polyurea layer is prepared by reacting together aliphatic alkylaromatic or aromatic diisocyanates or polyisocyanates with diamines or polyamines. Similarly aliphatic alkylaromatic or aromatic carboxylic acids can be reacted with the aliphatic, alkylaromatic or aromatic diisocyanates or polyisocyanates to produce the polyurea polymer. Furthermore, mixtures of the aforesaid materials can be used to produce a complex polyurea polymer mixture.

The diisocyanates are preferably aromatic diisocyanates having the general structure:

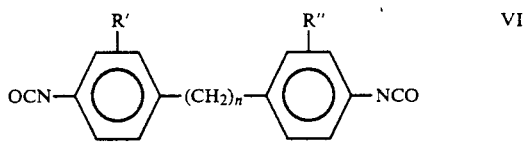

VI wherein R' and R" are the same or different and are selected from the group consisting of H, $C_1$-$C_5$ and $C_6H_5$ and n ranges from 0 to 4.

Diamine useful in the production of urea polymers have the general formula $H_2NRNH_2$ where R includes aliphatic and aromatic moieties such as

VII where n is 1 to 10.

Also included are diamine chain extenders of the formula:

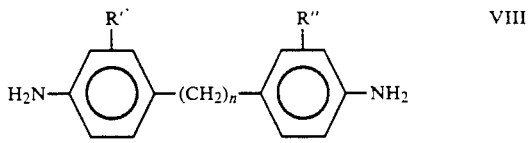

VIII where R' and R" are the same or different and are selected from the group consisting of H or a $C_1$ to $C_5$ or $C_6H_5$ and n ranges from 0 to 4.

Examples of these materials have been previously described above.

When combining the isocyanates with the diamines, or similarly the carboxylic acids with the isocyanates to produce the polyurea polymer it is preferred that they be combined such that the total aromatic carbon content of the resulting polyurea polymer be about 86% or less, preferably about 50 to 75%. This is so since polyurea polymers with very high aromatic carbon content tend to be glassy rather than elastomeric in nature and in the practice of the present invention it is desirable for the polyurea membrane to be elastomeric in nature at the temperatures employed in the aromatics saturates separation process.

The polyurea polymer produced will generally have a molecular weight ranging from about 30,000 to about 150,000, preferably about 50,000 to about 100,000. The maximum molecular weight in reality is set by the necessity of dissolving the polyurea polymer in a solvent in order to facilitate membrane fabrication. Since the higher molecular weight polymers are more difficult to dissolve in any given solvent system, solvation is typically augmented by the application of heat. Since it is a desirable characteristic of these polyurea membranes that they be temperature resistant, it is generally true that the higher molecular weight polymers are preferred for the production of membranes.

Thus, it is apparent that a compromise must be struck regarding polymer molecular weight. The polymer must not be so high in molecular weight that it becomes insoluble in solvents and thus uncastable into membranes, yet its molecular weight must be high enough so that the membrane which is cast exhibits resistance to elevated temperatures. One solution to this dilemma is to employ a lower molecular weight polymer during the casting procedure and subsequently increase the molecular weight of polymer once the membrane has been fabricated. The molecular weight of the polymer in the membrane can be increased by a post-crosslinking procedure.

Post crosslinking, crosslinking practiced after the polyurea membrane has been produced can be accomplished by employing thermal or chemical means familiar to the art. Chemical crosslinking is accomplished by adding formaldehyde or additional diisocyanates, said crosslinking techniques being familiar to those skilled in the art.

Membrane thermal stability is also effected by the degree of aromaticity of the polymer and by the degree of hydrogen bonding. However, since polymer aromaticity is generally set at the time of polymerization and since high aromaticity produces a membrane of a glassy nature, it is apparent that the simplest way in which to produce high temperature stable membranes involves the post crosslinking step.

When producing a thin film composite membrane of polyurea/polyurethane alloy, the components going to make up the individual polymers are those recited above. In such a case the ratio of polyurea polymer to polyurethane polymer is in the range about 5 to about 95 wt % polyurea, preferably about 10 to about 90 wt % polyurea, most preferably about 25 to about 75 wt % polyurea.

Finally, if one desires to produce the composite membrane consisting of polyurea polymer and polyurea/urethane copolymer, again the components used to produce the polymer and copolymer are as recited above. In such a case the ratio of polyurea polymer to polyurea/urethane copolymer is in the range 10 to 90, preferably 25 to 75.

The above are presented solely by way of example. Those skilled in the art, with the present teaching before them, can select from the innumerable materials available the various starting materials which upon combination as described herein will produce the desired polymer, copolymer or polymer alloy which can then be used to produce the thin film composite membranes useful for the separation of aromatics from saturates.

The solvent employed is one in which the copolymer polymer, polymer alloy precursors are soluble but in which the polymer, copolymer or polymer alloys will precipitate to form a dispersion of fine particles but which will not dissolve or otherwise unduly weaken the thick, porous support layer upon which the dispersion is desposited.

Examples of such solvent include 1,4-dioxane, ketones (e.g. acetone, methyl ethyl ketone), aromatics (e.g. toluene, xylenes) cellosolve acetate, tetrahydrofuran.

Examples of useful support layer materials include, polyolefins such as polyethylene, polypropylene etc., teflon, polyesters, nylon, non woven fiberglass, polyimides, polyamides, polysulfones, polyacrylonitriles, and polybenzimidazoles.

These supports can be of any imaginable physical shape including sheets, tubes, fibers etc. The thin active layer may be deposited on either the inner or outer surface of such tube or hollow fiber support. In operation, the feed to be separated preferably will be contacted with the thin active layer face of the composite membrane.

Due to the extreme thinness of the selective polymer, copolymer or polymer alloy layer the composite membrane, exhibits extremely high flux while maintaining a very high level of selectivity.

The thin film composite membranes are useful for the separation of aromatics from saturates in petroleum and chemical streams, and have been found to be particularly useful for the separation of large substituted aromatics from saturates as are encountered in heavy cat naphtha streams. Other aromatics containing streams which are suitable feeds for separation are intermediate cat naphtha streams coiling in the 200°-320° F. range, light aromatics/saturates streams boiling in the $C_5$-300° F. range, light cat cycle oil boiling in the 400°-650° F. range as well as streams containing benzene, toluene, xylene or other aromatics typically encounter in chemical plant processes. The separation techniques which may successfully employ the membranes of the present invention include perstraction and pervaporation.

Perstraction involves the selective dissolution of particular components contained in a mixture into the membrane, the diffusion of those components through the membrane and the removal of the diffused components from the downstream side of the membrane by use of a liquid sweep stream. In the perstractive separation of aromatics from saturates in petroleum or chemical streams (particularly heavy cat naphtha streams) the aromatic molecules present in the feedstream dissolve into the membrane film due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include, for example, $X_3$ to $C_6$ saturated hydrocarbons and lube basestocks ($C_{15}$-$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction of the porous backing.

If $C_3$ or $C_4$ sweep liquids are used at 25° C. or above in liquid state, the pressure must be increased to keep them in the liquid phase.

Pervaporation, by comparison, is run at generally higher temperatures then perstraction and relies on vacuum on the permeate side to evaporate the permeate from the surface of the membrane and maintain the concentration gradient driving force which drives the separation process. As in perstraction, the aromatic molecules present in the feed dissolve into the membrane film, migrate through said film and reemerge on the permeate side under the influence of a concentration gradient. Pervaporative separation of aromatics from saturates can be performed at a temperature of about 25° C. for the separation of benzene from hexane but for separation of heavier aromatic/saturate mixtures, such as heavy cat naphtha, higher temperature of at least 80° C. and higher, preferably at least 100° C. and higher, more preferably 120° C. and higher should be used, the maximum upper limit being that temperature at which either the membrane is physically damaged. Vacuum on the order of 1-50 mm Hg is pulled on the permeate side. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral wound or plate and frame permeation cell modules. Tubes and hollow fibers of membranes may be used in bundled configurations with either the feed or the sweep liquid (or vacuum) in the internal space of the tube or fiber, the other material obviously being on the other side.

Most conveniently, the membrane is used in a hollow fiber configuration with the thin active layer in the outer surface. Feed is introduced on the exterior side of the fiber, the sweep liquid flowing on the inside of the hollow fiber to sweep away the permeated highly aromatic species, thereby maintaining the desired concentration gradient. The sweep liquid, along with the aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering of temperature.

The present invention will be better understood by reference to the following Examples which are offered by way of illustration and not limitation.

EXAMPLE 1

Production of copolymer suspension-dispersion

A suspension containing a polyurea/urethane polymer is prepared as follows: Two hundred forty-one grams (0.125 mole) of polyethylene adipate (MW = 1928) and 62.5 grams (0.250 mole) of 4,4'diisocyanato-diphenylmethane were added to a 1 liter resin pot equipped with a stirrer and drying tube. The temperature was raised to 95° C. and held for 2.75 hours with stirring to produce an isocyanate-capped prepolymer.

A stock solution was prepared from this prepolymer as follows: three point three nine (3.39) grams of the above prepolymer was added to 42.785 grams of 1,4-dioxane to produce a solution containing 7.34 wt. % prepolymer. Exactly 3.00 grams of this stock solution (0.0000906 moles of prepolymer) were placed into a 25 ml bottle. A second stock solution containing a diamine was prepared as follows. Exactly 0.746 grams of 4,4'-diamino-diphenyl methane (MDA) were added to 8.3641 grams of 1,4-dioxane and dissolved forming a solution of 0.88 wt % diamine.

To the bottle containing the prepolymer solution were added exactly 2.0764 grams (0.0000928 moles) of the MDA solution and an additional 6.9838 grams of dioxane and the contents of the bottle were stirred overnight whereupon a translucent suspension of polyurea/urethane was formed. The concentration of this suspension was 1.98 wt % in dioxane.

EXAMPLE 2

Production of composite membrane

A thin film composite membrane was formed as follows. A piece of polypropylene microporous material (Celgard 2500) having an approximate pore size of 0.04 micron was clamped into a frame so that only one side would be exposed to the coating suspension. The 1.98 wt % suspension from EXample 1 was poured onto the Celgard and allowed to stand for approximately one minute; whereupon it was poured off. The membrane was placed in a vertical position to allow excess suspension to run off. The procedure was repeated a second time after the dioxane had evaporated from the first application. Contact time for the second application was only 30 seconds. The film was allowed to dry overnight.

This composite membrane possessed a Urea Index of 50, a functional group density ($\Sigma CO + NH/1000$ g polymer) of 13, $CO=O/NH$ ratio of 4.67 and an aromatic carbon content of 25.5%.

Description of the Prestraction Test

In order to evaluate the performance of the membrane from Example 2, a perstraction test was carried out in the following manner. Approximately 350 ml of model feed A was placed into the right hand side of a perstraction apparatus. The membrane to be tested was then clamped between this section and the sweep chamber which was approximately 3 mm deep. The coated side was positioned facing the sweep chamber. The feed was stirred magnetically and heated to the desired temperature. Sweep liquid was distilled from the permeate receiver and recirculated by gravity through the sweep chamber thus carrying away permeate. The sweep liquid was typically chosen to be an alkane that was much lighter than the feed for ease of separation. Samples were withdrawn from the permeate receiver as a function of time and analyzed chromatographically to determine the change in concentration as a function of time.

Model Feed A

| Component | Weight |
|---|---|
| 1 4-xylene | 9.97 |
| 1,3,5-trimethylbenzene (mesitylene) | 10.16 |
| 1-decane | 20.91 |
| n-decane | 31.75 |
| 1,2,3,5,-tetramethylbenzene (isodurene) | 9.60 |
| naphthalene | 8.49 |
| pentamethylbenzene | 9.12 |
| | 100.00 |

EXAMPLE 3

For comparison, a dense film membrane of the same polymer composition was prepared in solution in dimethylformamide and cast onto a glass plate using a casting knife. The thickness of this membrane as measured by SEM was 11.5 microns.

EXAMPLE 4

Perstraction tests using model feed A were run on the suspension-coated membrane from Example 2 and the unsupported dense film from Example 3. Results are shown in the following table.

TABLE 1

| Membrane from Example | 2 | 3 |
|---|---|---|
| Temperature (°C.) | 30 | 30 |
| Total Flux (kg/m$^2$/d) | 17.2 | 2.4 |
| Selectivity vs n-decane to | | |
| Xylene | 13.6 | 13.3 |
| Mesitylene | 7.6 | 7.1 |
| Isodurene | 5.7 | 5.3 |
| Naphthalene | 20.0 | — |
| Pentamethylbenzene | 4.5 | — |
| 1-Decene | 1.7 | 1.7 |

Selectivity in these tests was defined as $$\frac{(\text{Conc. Species i/Conc. n-decane})_{permeate}}{(\text{Conc. Species i/Conc. n-decane})_{feed}}$$

As can be seen, the membrane that is prepared by the process of the current invention has seven times the flux at the same selectivity as one prepared from a true solution.

The active layer of the composite membrane of Example 2 was about 2 μ by SEM.

What is claimed is:

1. A method for separating aromatics from feeds which are mixtures of aromatics and non-aromatics which method consists of selectively permeating the aromatic hydrocarbon through a thin composite membrane consisting of a thin active layer selected from polyurea/urethane, polyurea, polyurea-polyurethane alloy or polyurea-polyurea/urethane alloy deposited on a thick porous support layer, said thin composite membrane being made by depositioning said thin active layer from a dispersion-suspension onto said support layer, the dispersion containing from 0.5 to 10% polymer.

2. The method of claim 1 wherein the polyurea/polyurethane layer of the thin composite membrane is characterized by possessing a urea index of at least about 20% but less than 100% an aromatic carbon content of at least 15 mole percent, a functional group density of at least 10 per 1000 grams polymer and a C=O/NH ratio of less than about 8.

3. The method of claim 1 wherein the polyurea layer of the thin composite membrane has a total aromatic carbon content of about 86% or less.

4. The method of claim 1 wherein the polyurea-polyurethane alloy layer is characterized by possessing about 5-95 wt % polyurea.

5. The method of claim 1 wherein the separation is performed under pervaporation conditions.

6. The method of claim 1 wherein the separation is performed under perstraction conditions.

7. The method of claim 1 wherein the porous support layer is selected from polyamide, polyimide, polyacrylonitrile, polybenzimidazol, cellulose acetate, teflon and polyolefins.

* * * * *